Patented Mar. 11, 1952

2,588,608

UNITED STATES PATENT OFFICE 2,588,608

Δ8,(14)-ANDROSTENDIOLS AND PROCESS

Seymour Bernstein and Karl J. Sax, Pearl River, N. Y., and Dominic Giancola, Jersey City, N. J., assignors to American Cyanamid Company, New York, N. Y., a corporation of Maine No Drawing. Application June 14, 1950, Serial No. 168,164

9 Claims. (Cl. 260—397.5)

This invention relates to new cyclopentano phenanthrene derivatives and methods of preparing the same. More particularly, it relates to Δ8(14)-androsten-3β,17β-diol, esters thereof and methods of preparing the same.

Butenandt, Hausman and Paland Ber. 71, 1316 (1938) describe the preparation of Δ5,7-androstadiene-3β,17β-diol from Δ5-androsten-3β,17β-diol diacetate by the classical method of Windaus. We have found that this intermediate and esters thereof can be used as starting material for the preparation of the valuable compounds of the present invention.

These compounds may be illustrated by the following general formula:

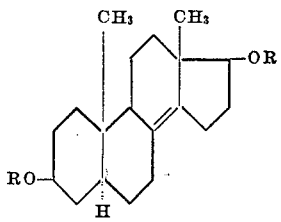

in which R is hydrogen or an acyl radical.

The compounds of the present invention are generally soluble in organic solvents such as chloroform or benzene, insoluble in water and have definite melting points.

The reaction to prepare the compounds of the present invention may be carried out by dissolving an ester of Δ5,7-androstadien-3β,17β-diol in an acidic solvent. A hydrogenation catalyst is then added to the reaction mixture and the theoretical amount of hydrogen for the hydrogenation of one double band is introduced into the mixture. After the mixture has taken up the desired amount of hydrogen, the catalyst is removed by filtration and the product precipitates on the addition of water. The product is further purified by crystallization from aqueous alcoholic solution.

The hydrogenation catalysts useful in the process of the present invention are the oxides of platinum, palladium and similar metals generally used in hydrogenation reactions. The ratio of catalyst to intermediate in carrying out the process is not critical. We have found, however, that good results are obtained when about 10% catalyst is used in the process.

The process of the present invention is preferably carried out at room temperature and at atmospheric pressure, however, it may be carried out under higher pressure in a closed vessel, if desired. It can be made to take place at any temperature within the range of about 5° C. to about 90° C. The reaction is usually complete within a period of from 10 minutes to about 2 hours.

The compounds of the present invention are useful as pharmaceuticals, particularly in the field of hormones.

The invention will be described in greater detail in the following examples which illustrate the preferred method of preparing Δ8(14)-androsten-3β,17β-diol and representative esters thereof by the hydrogenation of the corresponding Δ5,7-androstadien-3β-17β-diol.

Example 1

To 11.955 mg. of platinum oxide catalyst in 5 ml. of glacial acetic acid previously reduced with hydrogen is added 73.765 mg. of Δ5,7-androstadien-3β,17β-diol diacetate. The hydrogenation is carried out to constant reading. After one-half hour 4.54 ml. (standard temperature and pressure) of hydrogen is consumed and after 1¼ hours, 4.62 ml. (S. T. P.) of hydrogen. The calculated hydrogen for one double bond is 4.53 ml. (S. T. P.). The catalyst is removed by filtration. Water is added, and the resulting precipitate is collected after standing. It is washed with a copious amount of water and has a melting point of 134°–136° C. Recrystallization to constant melting point from dilute methanol gives 52 mg. of analytically pure Δ8(14)-androsten-3β,17β-diol diacetate having a melting point of 136.5°–138° C.

Example 2

A mixture of 150 mg. of Δ8(14)-androsten-3β,17β-diol diacetate and 55 ml. of 5% alcoholic potash is refluxed on the steam bath for 45 minutes. The addition of water gave a finely divided precipitate which was collected by filtration, and was washed with a copious amount of water; melting point 161°–163° C. Recrystallization to constant melting point from dilute methanol gives the analytically pure Δ8(14)-androsten-3β,17β-diol, melting point, 166.5°–168° C.

Example 3

Thirty milligrams of Δ8(14)-androsten-3β,17β-diol in 1.2 ml. of pyridine is treated with ice-cooling with 0.3 ml. of benzoyl chloride. The mixture is allowed to stand at room temperature for 22 hours. Addition of ice-cold dilute hydrochloric acid gives an oil which is worked up in benzene. Evaporation of the benzene extract gives an oil which crystallizes on the addition of methanol; weight, 30 mg., melting point 164°–166° C. with previous softening. The Δ8(14)-androsten- $3\beta,17\beta$-diol dibenzoate is recrystallized from acetone-methanol, and when analytically pure has a melting point of 170.5°–171.5° C.

We claim:

1. A compound of the group having the general formula:

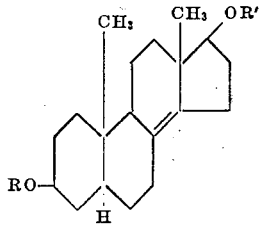

in which R and R' are members of the group consisting of hydrogen, lower alkyl carbonyl and benzoyl radicals.

2. $\Delta^{8(14)}$-Androsten-$3\beta,17\beta$-diol.

3. $\Delta^{8(14)}$-Androsten-$3\beta,17\beta$-diol diacetate.

4. $\Delta^{8(14)}$-Androsten-$3\beta,17\beta$-diol dibenzoate.

5. A method of preparing a member of the group consisting of $\Delta^{8(14)}$-androsten-$3\beta,17\beta$-diol and esters thereof which comprises reacting a corresponding $\Delta^{5,7}$-androstadien ester with a hydrogenation catalyst in an acidic solvent in the presence of hydrogen and recovering the product therefrom.

6. A method of preparing a member of the group consisting of $\Delta^{8(14)}$-androsten-$3\beta,17\beta$-diol and esters thereof which comprises reacting a corresponding $\Delta^{5,7}$-androstadien ester with a hydrogenation catalyst at a temperature within the range of about 5° C. to about 90° C. in an acidic solvent in the presence of hydrogen and recovering the product therefrom.

7. A method of preparing $\Delta^{8(14)}$-androsten-$3\beta,17\beta$-diol which comprises reacting a $\Delta^{5,7}$-androstadien ester with platinum oxide catalyst in acetic acid in the presence of hydrogen, hydrolyzing the resulting product and recovering said compound therefrom.

8. A method of preparing $\Delta^{8(14)}$-androsten-$3\beta,17\beta$-diol diacetate which comprises reacting a $\Delta^{5,7}$-androstadien-$3\beta,17\beta$-diol diacetate with platinum oxide in acetic acid in the presence of hydrogen and recovering said compound therefrom.

9. A method of preparing $\Delta^{8(14)}$-androsten-$3\beta,17\beta$-diol dibenzoate which comprises reacting a $\Delta^{5,7}$-androstadien-$3\beta,17\beta$-diol dibenzoate with platinum oxide in acetic acid in the presence of hydrogen and recovering said compound therefrom.

SEYMOUR BERNSTEIN.
KARL J. SAX.
DOMINIC GIANCOLA.

No references cited.